(12) United States Patent
Solomon et al.

(10) Patent No.: US 10,830,684 B2
(45) Date of Patent: Nov. 10, 2020

(54) REPRODUCIBLE REFERENCE STANDARDS FOR FILTER-BASED MEASUREMENTS OF CARBONACEOUS AEROSOLS FOUND IN ENVIRONMENTAL SAMPLES

(71) Applicant: GOVERNMENT OF THE UNITED STATES AS REPRESENTED BY THE ADMINISTRATOR OF THE U.S. ENVIRONMENTAL PROTECTION AGENCY, Washington, DC (US)

(72) Inventors: Paul A. Solomon, Henderson, NV (US); Anthony D. A. Hansen, Berkeley, CA (US); Anna-Marie Hyatt, Las Vegas, NV (US)

(73) Assignee: GOVERNMENT OF THE UNITED STATES AS REPRESENTED BY THE ADMINISTRATOR OF THE U.S. ENVIRONMENTAL PROTECTION AGENCY, Washington, DC (US)

( * ) Notice: Subject to any disclaimer, the term of this patent is extended or adjusted under 35 U.S.C. 154(b) by 45 days.

(21) Appl. No.: 16/160,637

(22) Filed: Oct. 15, 2018

(65) Prior Publication Data

US 2019/0113431 A1   Apr. 18, 2019

Related U.S. Application Data

(60) Provisional application No. 62/606,922, filed on Oct. 13, 2017.

(51) Int. Cl.
*G01N 15/06* (2006.01)
*G01N 21/27* (2006.01)
(Continued)

(52) U.S. Cl.
CPC ....... *G01N 15/0618* (2013.01); *C09D 11/322* (2013.01); *C09D 11/324* (2013.01);
(Continued)

(58) Field of Classification Search
CPC ......... C09D 11/324; G01N 2015/0046; G01N 21/278
See application file for complete search history.

(56) References Cited

U.S. PATENT DOCUMENTS

2013/0262008 A1*  10/2013  Ramanathan .......... G01N 21/55
                                                                        702/85

OTHER PUBLICATIONS

D. Baumgardner et al., Soot reference materials for instrument calibration and intercomparisons: a workshop summary with recommendations, Aug. 2, 2012, 1869-1887, Atmos. Meas. Tech.
(Continued)

*Primary Examiner* — Yara B Green
(74) *Attorney, Agent, or Firm* — Stein IP, LLC

(57) ABSTRACT

The method of the invention provides a simple, reproducible reference, or set of reference standards, as a validation of a calibration standard for filter-based measurements of light absorbing aerosol particles (black carbon and brown carbon) and organic carbon and elemental carbon particles found in indoor and outdoor environments, and in emission streams. The set of reference standards comprise grayscale images deposited by a mist or print at a known density on a substrate material. The reference standards may be made by a printer using as a substrate either paper or another material such as glass fiber, quartz fiber, polypropylene, or cellulose.

20 Claims, 10 Drawing Sheets

IR ATN 5          IR ATN 16         IR ATN 44         IR ATN 68

IR ATN 88         IR ATN 104        Blank

- Inkjet Printer
- Black Pigment Base Ink
- Non-Recycled Paper

(51) Int. Cl.

| | |
|---|---|
| *C09D 11/324* | (2014.01) |
| *C09D 11/322* | (2014.01) |
| *G03G 15/00* | (2006.01) |
| *C09D 11/328* | (2014.01) |
| *G01N 1/28* | (2006.01) |
| *G03G 15/16* | (2006.01) |
| *G01N 15/00* | (2006.01) |
| *G03G 21/20* | (2006.01) |

(52) U.S. Cl.
CPC .............. *C09D 11/328* (2013.01); *G01N 1/28* (2013.01); *G01N 21/278* (2013.01); *G03G 15/55* (2013.01); *G01N 2001/2893* (2013.01); *G01N 2015/0046* (2013.01); *G03G 15/16* (2013.01); *G03G 21/20* (2013.01)

(56) References Cited

OTHER PUBLICATIONS

Christopher M. Long et al., Carbon black vs. black carbon and other airborne materials containing elemental carbon: Physical and chemical distinctions, 2013, pp. 271-286, Environmental Pollution.

Apoorva Pandey et al., Aerosol light absorption from attenuation measurements of PTFE-membrane filter samples: implications for particulate matter monitoring networks, Aug. 1, 2018, pp. 1-12, Atmos. Meas. Tech.

Ruchen Zhu et al., Standard source of atmospheric black carbon aerosol generated from ultrasonic spray of BC suspension, Aug. 30, 2017, pp. 1-12, Atmos. Meas. Tech.

Optical Transmission Analysis of NIST Reference Material 8785 and Neutral Density Filters, Aug. 2015, Magee Scientific Aethalometer.

John G. Watson et al., Summary of Organic and Elemental Carbon/Black Carbon Analysis Methods and Intercomparisons, 2005, vol. 5, No. 1, pp. 65-102, Aerosol and Air Quality Research.

Tanveer Ahmed et al., Measurement of black carbon (BC) by an optical method and a thermal-optical method: Intercomparison for four sites, Sep. 18, 2009, pp. 6305-6311, Atmospheric Environment 43.

P. R. Buseck et al., Are black carbon and soot the same?, Sep. 21, 2012, pp. 24821-24846, Atmos. Chem. Phys. Discuss.

L.-W. A. Chen et al., Multi-wavelength optical measurement to enhance thermal/optical analysis for carbonaceous aerosol, Jan. 27, 2015, pp. 451-461, Atmos. Meas. Tech.

Yuan Cheng et al., Brown and black carbon in Beijing aerosol: Implications for the effects of brown coating on light absorption by black carbon, 2017, pp. 1047-1055, Science of the Total Environment.

L.A. Gundel et al., The relationship between optical attenuation and black carbon concentration for ambient and source particles, 1984, pp. 197-202, The Science of the Total Environment.

Odelle L. Hadley et al., Modified Thermal-Optical Analysis Using Spectral Absorption Selectivity To Distinguish Black Carbon from Pyrolized Organic Carbon, 2008, pp. 8459-8464, Environ. Sci. Technol.

A.D.A. Hansen et al., Real-time measurement of the absorbtion coefficient of aerosol particles, Sep. 1, 1982, Applied Optics, vol. 21, pp. 3060-3062.

R. Hitzenberger, et al., Intercomparison of Thermal and Optical Measurement Methods for Elemental Carbon and Black Carbon at an Urban Location, 2006, Environmental Science and Technology, vol. 40, No. 20, pp. 6377-6383.

H. Horvath, Comparison of Measurements of Aerosol Optical Absorption by Filter Collection and a Transmissometric Method, 1993, Atmospheric Environmental, vol. 27A, No. 3, pp. 319-325.

Thomas W. Kirchstetter et al., Controlled generation of black carbon particles from a diffusion flame and applications in evaluating black carbon measurement methods, Atmospheric Environment, 2007, 1874-1888.

George A. Klouda et al., Reference Material 8785: Air Particulate Matter on Filter Media, Aerosol Science and Technology, 2005, pp. 173-183.

Jana S. Kesavan et al., Comparison of Particle Number Counts Measured with an Ink Jet Aerosol Generator and an Aerodynamic Particle Sizer, Aerosol Science and Technology, 2014, 48:2, pp. 219-227, DOI: 10. 1080/02786826.2013.868594.

Ann Y. Watson et al., Carbon Black and Soot: Two Different Substances, 2001, American Industrial Hygiene Association, 62:2. pp. 218-228, DOI: 10. 1080/15298660108984625.

John G. Watson et al., Summary of Organic and Elemental Carbon/Black Carbon Analysis Methods and Intercomparisions, 2005, Aerosol and Air Quality Research, vol. 5, No. 1, pp. 65-102.

* cited by examiner

- Inkjet Printer
- Black Pigment Base Ink
- Quartz-Fiber Material

Blank

IR ATN 88

IR ATN 16

- Inkjet Printer
- Black Pigment Base Ink
- Polypropylene Material

Blank

IR ATN 88

IR ATN 16

- Inkjet Printer
- Black Pigment Base Ink
- Cellulose Material

Blank

IR ATN 88

IR ATN 16

REPRODUCIBLE REFERENCE STANDARDS FOR FILTER-BASED MEASUREMENTS OF CARBONACEOUS AEROSOLS FOUND IN ENVIRONMENTAL SAMPLES

CROSS-REFERENCE TO RELATED APPLICATIONS

This application claims the benefit of priority to U.S. Provisional Application No. 62/606,922, filed Oct. 15, 2017, in the U.S. Patent and Trademark Office. All disclosures of the documents named above are incorporated herein by reference.

BACKGROUND OF THE INVENTION

Field of the Invention

The invention relates generally to the measurement of important components of atmospheric particulate matter found in indoor and outdoor environments, and in direct or dilute source emissions. The components of atmospheric particulate matter include light absorbing components and other major carbonaceous components. More specifically, the invention is concerned with reference standards for the analysis of filter samples measuring carbonaceous aerosols such as black carbon (BC), brown carbon (BrC), organic carbon (OC) and elemental carbon (EC), particularly where the samples are analyzed using optical absorption (either transmittance or reflectance), thermal, thermal-optical, or chemical analysis methods.

There is a gap in the validation and universal calibration of widely used critical methods for the measurement of the black carbon (BC, similar to elemental carbon, or 'soot' but differs by analytical method), brown carbon (BrC), organic carbon (OC) and elemental carbon (EC) content of aerosol particles collected both from ambient atmospheres (indoor and outdoor) as well as direct and diluted source emissions. These samples are collected on filters and may be analyzed by optical absorption (both transmittance and reflectance), thermal or thermo-optical, and chemical analytical methods. Considerable disagreement exists among methods used to determine and quantify the light-absorbing and other major components of aerosol samples due to the range of methods that essentially measure different aspects of these components. Consequently, determinations of black carbon, elemental carbon and/or organic carbon and by optical, thermal-optical, and/or chemical methods are operationally defined. Filter-based optical methods measure the attenuation or loss of light either transmitted through, or reflected from, the filter on which the particles are deposited. Most of this attenuation is usually attributable to black carbon. Depending on other components of the aerosol, some attenuation (especially if measured at shorter wavelengths) may be attributed to the presence of brown carbon, the latter frequently being associated with emissions from wood burning or similar materials. In certain areas, the presence of mineral dust may contribute to optical absorption, such as crustal material having a light brownish to yellow color.

One optical method, optical transmittance, uses a blank filter as the reference, relative to which the attenuation of transmitted light due to the deposit of collected particles is determined. The result is a function of the optical wavelength used for analysis, the type of filter on which the aerosol was collected, and the type of instrument used (e.g., Aethalometer, transmissometer, other, etc.). The result is expressed in units of $m^2$ of absorption per $m^2$ of filter. The conventional designation is attenuation, abbreviated as ATN, and defined as $100 \ln\{((\text{incident light})/((\text{transmitted light}))\}$. This is a dimensionless number related to optical density by a scaling factor of 100 chosen for numerical convenience. An ATN value of 5 is seen for a barely-visible deposit of very light gray color, a clearly visible medium gray deposit may have an ATN value of 40 to 60, and a dark gray deposit would yield an ATN measurement of 150 or larger. Extremely heavy deposits of light-absorbing material will cause the optical transmission measurement method to saturate. Realistically, it is not possible to unequivocally claim accuracy of data for ATN results of 200 units or greater. The presence of aromatic organic compounds (such as are found in tobacco smoke or smoke from burning wood, for example) may have very little absorption of infrared or visible light (i.e., ATN measured at a wavelength of 880 nm may be almost zero), while they may have extremely strong absorption in the ultraviolet, so that a large ATN value would be measured at a wavelength of 370 nm. Consequently, it is always necessary to specify the optical wavelength used for the determination of ATN. Optical measurements may be compared to primary photometric standards of absorbance and reflectance, such as are maintained by and available from the National Institute of Standards and Technology. Conversion of the optical measurement to a mass of carbon is typically achieved by comparison with thermal, thermal-optical, or chemical methods which yield a result expressed as a mass in grams per $cm^2$ of filter material. However, these thermal/thermal-optical/chemical methods yield results that are extremely dependent on instrument settings and sample preparation. While these results, that are similar to black carbon, are expressed in terms of elemental carbon, it must be noted that there is neither a definition nor a standard of "elementarity". Black carbon (measured as ATN) is an optical measurement whereas elemental carbon (measured in $\mu g/m^3$) is a thermal-based measurement that uses an optical correction to account for the charring of organic components. Consequently, there is a clear need for the development of reproducible reference standards which could be used for optical and thermal/thermal-optical/chemical methods for black carbon, brown carbon, elemental carbon and organic carbon. The result and product arising from this invention would create a uniform basis for the quantitative measurement of black carbon and elemental carbon and a direct comparison between the two with the standards able to provide calibration factors among the methods. Reproducible reference standards for brown carbon and organic carbon are also developed.

The US EPA, and State and Local Air Quality Agencies, are required to develop State Implementation Plans (SIPs) designed to reduce the levels of criteria pollutants below National Ambient Air Quality Standards. Black carbon (or elemental carbon), brown carbon, and organic carbon are key components of particulate matter (PM), frequently representing 50 to 80% of the total mass. Regulatory standards exist for both PM10 (particles below 10 μm aerodynamic diameter), which are deposited to the body in the upper respiratory tracts and primarily impact the respiratory system, exacerbating asthma especially in young and elderly people; and PM2.5 (particles below 2.5 μm aerodynamic diameter), which are fully respirable and have been linked to adverse health effects, including cancer, and respiratory and cardiovascular impacts. Specific components of particulate matter, notably black carbon have been shown to have a larger correlation with adverse health effects, suggesting that these species are disproportionally toxic. Different types of models are used to develop SIPs and they require linking concentrations of PM observed at receptor sites, back to the sources of the emissions. Knowledge of the chemical composition of the PM is critical to these models, in order that the SIPs may achieve their stated goals. This is because different sources or source types have unique chemical signatures (sea salt—NaCl; diesel emissions—BC; automobiles emissions—hopanes).

The measurement of black carbon, elemental carbon and brown carbon concentrations in the atmosphere also provides a means to calculate the in-situ light absorption, and to estimate the effect on the absorption of radiative energy if these particles are either deposited onto high-albedo surfaces (such as snow or ice) or incorporated into cloud droplets. This information is vital to calculations of the contribution of combustion-derived particles to increases in radiative forcing, leading to the potential for climate change (global warming). Direct and indirect radiative forcing by black carbon is second only to $CO_2$ in terms of its impact (warming) on the global climate system. However, unlike $CO_2$, aerosols have a much shorter atmospheric lifetime. Consequently, reduction of black carbon emissions could lead to an immediate reduction in radiative forcing by anthropogenic emissions. This means that accurate measurements of black carbon are essential to the development of effective policies.

Globally, cook stoves, residential heating, small-scale industry and other small, dispersed combustion sources, frequently fueled by biomass or coal, emit large amounts of black carbon. However, scientists, regulators and the concerned public in these areas, frequently do not have access to sophisticated instrumentation to measure these emissions and ambient-air concentrations. The development of printed-paper "grayscale" strips displaying multiple levels of light attenuation with their corresponding black carbon loadings ($\mu g/cm^2$), would provide an inexpensive product that could be used globally to estimate black carbon emissions and exposures using a simple air sampler and filter paper. These standards would also identify the brown carbon emitted from biomass or cook stove burning.

Based on the above, it is clear that developing reference standards for optical, thermal, thermal-optical, and chemical analysis methods would not only help to integrate and compare different optical, thermal, thermal-optical, and chemical analysis methods, but would also create a simple, inexpensive distributable reference for field use, especially in developing countries. While originally conceived as a standard method for black carbon, the proposed reference standard could also be applied as a validation and calibration approach for brown carbon. This will be done by fitting the data measured across the optical spectrum from infrared to UV wavelengths to an Angstrom Exponent model of optical absorption. Overall, having a reference standard for optical methods will help ensure consistency among groups and among optical methods for measuring black carbon and brown carbon in air and reduce the uncertainty in models designed to estimate source impacts at receptors as well as models examining global climate forcing.

Having a reference standard that includes organic carbon and elemental carbon (as black carbon or carbon black) deposited on filters with high reproducibility would also provide a reference standard for organic carbon and elemental carbon as determined by thermal, thermal-optical, and chemical methods. Organic carbon is one of the major chemical components found in particulate matter, and elemental carbon as measured thermally is a component of combustion and especially diesel emissions. Reducing the uncertainty in organic carbon and elemental carbon determinations would have a significant impact on uncertainty in air quality models designed to quantify source impacts at receptor sites.

Thus, there is a need for a reference method that would provide standard reference materials for black carbon and brown carbon measured optically, and organic carbon and elemental carbon measured by thermal, thermal-optical, or chemical methods. Such a method would greatly reduce uncertainty in the results between and among methods.

SUMMARY OF THE INVENTION

Broadly speaking, the invention provides a reference method that would allow for integration and comparison among the different optical, thermal, thermal-optical and chemical methods of analysis, greatly reducing uncertainty in the measurement of black carbon, brown carbon, elemental carbon and organic carbon.

In one embodiment, the invention embraces a set of reference standards for the analysis of filter samples measuring black carbon, brown carbon, organic carbon and elemental carbon, the reference standards including grayscale images deposited by a printer or mist at a precalculated density of light absorbing material on a substrate material.

In one embodiment, the substrate material is at least one member of the group consisting of paper, glass-fiber, quartz-fiber, cellulose, and polypropylene. In an embodiment, the paper is non-recycled white paper. In another embodiment, the glass-fiber is PTFE-coated.

In another embodiment of the invention, the glass-fiber, quartz-fiber, cellulose, or polypropylene are attached to paper or other reinforcing underlayment for the purpose of printing.

In one embodiment of the invention, the reference range of measured attenuation values for the set of reference standards is from 0 to 250 ATN units.

In one embodiment of the invention, the samples are analyzed using optical absorption, thermal analysis, thermal-optical analysis, or chemical analysis methods.

The set of reference standards of claim 1, wherein black carbon (BC) is measured at 880 nm and brown carbon is measured at 370 nm wavelength. In general, wavelengths between 350 nm and 1000 nm may be used to measure the various components of particulate matter at specific wavelengths between 350 nm and 1000 nm.

In one embodiment of the invention, the deposit of print or mist is made of an ink, a dye, a toner, a pigment, or mixtures of the same. In another embodiment, the ink, dye, toner, pigment, or mixtures of the same include carbon black. In yet another embodiment, the ink, dye, toner, pigment, or mixtures of the same do not contain metal oxides.

In one embodiment of the invention, the set of reference standards includes a blank that passes through the printer and a blank that does not pass through the printer.

In one embodiment of the invention, the reference standards are printed as strips on paper.

In one embodiment of the invention, the substrate material is paper, and a standalone printhead creates a reproducible mist deposit to create the set of reference the standards.

In one embodiment of the invention, the substrate material is coated with an inert substance that does not absorb light or sorb organic gases. The inert substance may be a metal but not a metal oxide. Exemplary metals used may include titanium, platinum, palladium or radium.

In one embodiment, the invention embraces a method of making the set of reference standards described above, the method including the steps of placing the substrate material in a printer and depositing the mist or print onto the substrate material in a pre-determined shade of gray.

In one embodiment of the invention, the printer is a laser printer and the print is a toner.

In another embodiment of the invention, the printer is an ink-jet printer and the mist is ink, dye, pigment, or mixtures of the same.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
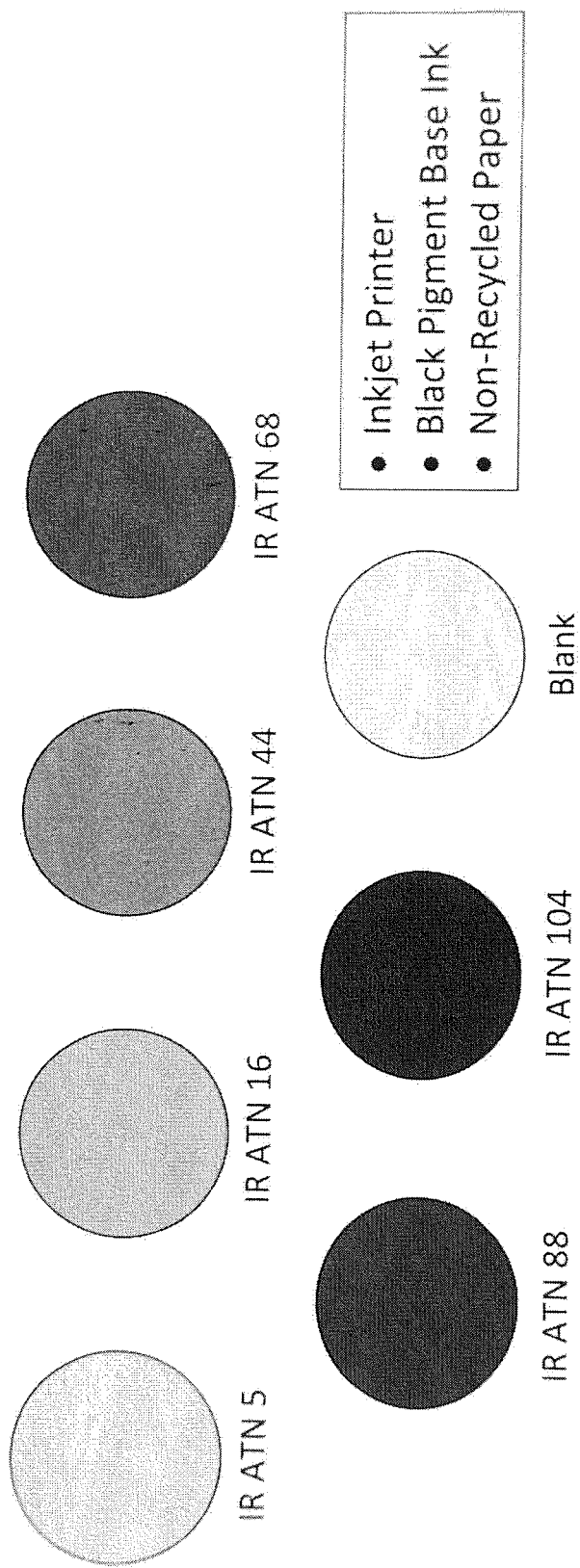
FIG. 1 is an illustration of one set of grayscale images which yield 6 different measured values of attenuation, including one blank, printed as circles in one font color setting (black) on paper with attenuation values ranging from 5 ATN to 104 ATN units. Each gray color is the result of a different print saturation density level based on the computer software employed. This figure represents printing on non-recycled paper, using an inkjet printer that employs black pigment ink a component of which is black carbon.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The method of the invention provides a simple and reproducible reference as a validation of a calibration standard for filter-based measurements of light absorbing particles (BC and BrC) and organic (OC) and elemental (EC) carbon particles found in indoor and outdoor environments, and in emission streams. Validation applies when using the reproducible reference for attenuation only, whereas calibration would be applied when the filters are identified with known values for BC mass and/or OC mass per unit area of reference material. Calibration for light absorbing compounds only applies to BC since quantification of the mass per area as BrC is not presently possible, because BrC is not a uniquely defined material. If and when this becomes possible, then these standards will also provide a calibration method for BrC. Here the inventors distinguish BC, measured by optical absorption, from EC, measured by thermal or thermal-optical analysis methods. Both these analytical methods will produce results using the reproducible reference created by the method of the invention; however, these different analytical methods will produce different analytical results, reflecting the difference in definition of BC and EC. Furthermore, the thermal, thermal optical, or chemical analysis method result for EC may vary considerably, depending on the analysis parameter settings and the analytical protocol which was used.

In one embodiment of the invention, inks, dye, or pigment used in inkjet printers, or toner used in laser printers, are used to print onto certain types of filter materials or paper creating a grayscale of known attenuation measured in the IR spectral range (for example 880 nm as used in the Aethalometer for BC) and UV spectral range (for example 370 nm for BrC). Grayscales obtained by collecting differing amounts of ambient PM and placing the collected PM onto filters have been used to estimate the amount of black carbon by visual comparison to filters collected in air with the different concentrations of BC collected on filters. In the present invention, the grayscale is related to a print density (or print saturation density level) setting on a printer, thus resulting in a highly reproducible series of ink, pigment, or toner printings with a known amount of BC content confirmed from either gravimetric analysis or by comparison to results of thermal, thermal-optical, or chemical analysis. It must be noted that thermal-optical analysis only may be performed on deposits printed onto quartz-fiber filters (which must be heat-treated by pre-firing prior to use, to remove any pre-existing carbon content, since most other filter substrate materials contain a large inherent carbon content. Other filter types (e.g., metal mesh or perforated stainless steel filters) may be applicable to thermal or thermal-optical analysis.

Not all available ink, dye, pigments, or toners contain carbon black. If carbon black is not present in the print material, only a negligible change in light absorption is noted. Therefore, carbon black must be one component of the complex organic mixture of the printing material, in order to obtain an expected response. (Here we use carbon black in ink, dye, ink, pigment, or toner to be synonymous with black carbon for the purposes of light absorption.)

Printing in grayscale also provides material with optical absorption in the UV range, usable as a surrogate for BrC. It is also necessary to use only the black component of multicolor printers, a feature not necessarily found in all printers.

In one embodiment of the invention, the range of measured attenuation values (ATN) is between 5 ATN and 150 ATN units, corresponding to optical densities from 0.05 to 1.5. These print densities are set in software, specifying the use of a material (e.g., black ink, dye, pigment, or toner) deposited on the substrate material (substrate). Additionally, substrate settings and print quality may also be adjusted in the software for the printer. Three to ten values or more of grayscale settings are created to develop a full range of deposition for the BC and BrC content. Additional print saturation densities yielding measurements between 5 and 150 ATN units; and even over 150 ATN units; may be programmed and produced. The position on the printed page is fixed for all printings within a set, to obtain the best reproducibility. Acceptable reproducibility (as a percentage coefficient of variation) is less than 10% at higher ATN and less than 15% at lower ATN values when printing on PTFE-coated glass fiber filter material. In practice, reproducibility to within 2% may be obtained within one like set of filter material (e.g., PTFE-coated glass fiber filter material) but comparisons among (inclusive in the analysis) different batches of the same filter material may lead slightly less reproducible results. As well, reproducibility likely depends on the filter material as 2% has been achieved with PTFE-coated glass fiber filter material but due to the nature of quartz-fiber filter material, slightly less reproducible results may be expected. The product, either on paper or on various filter materials, is stable over a wide range of temperatures and humidity, as observed over the passage of time in a normal environment.

Figure 2:
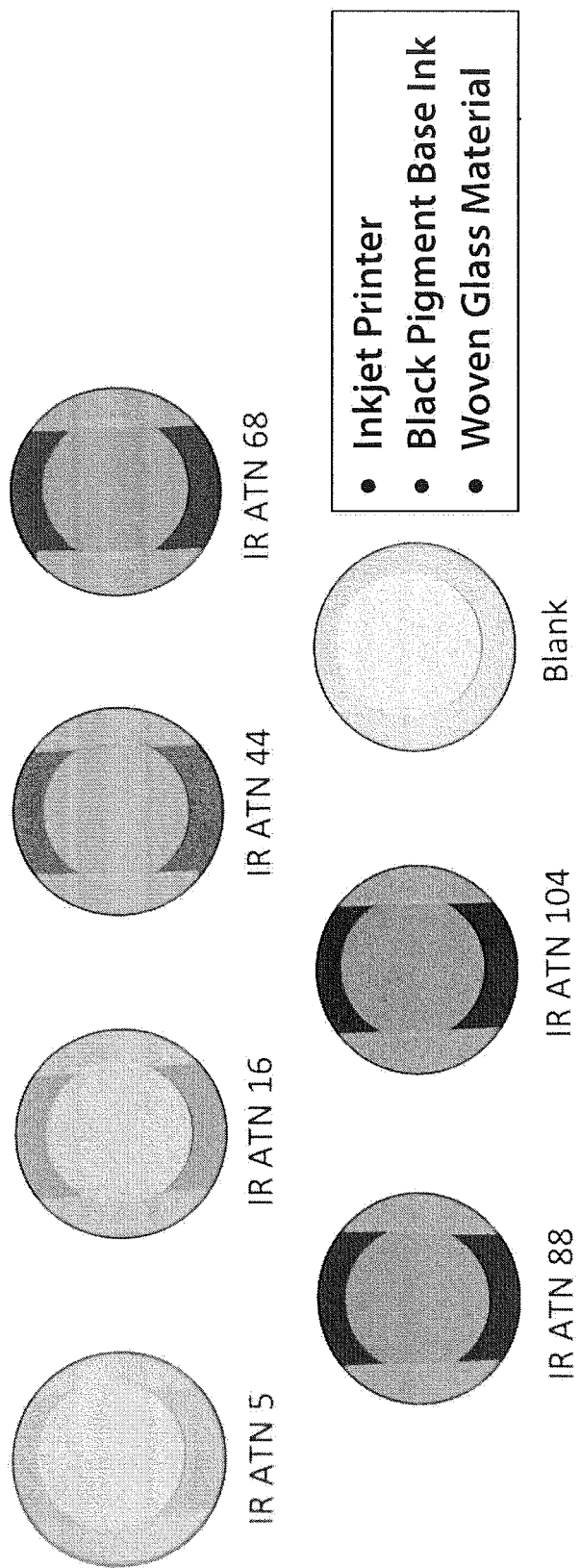
FIG. 2 is an illustration of one set of grayscale images which yield 6 different measured values of attenuation, including one blank, printed as circles in one font color setting (black) on polytetrafluoroethylene (PTFE)-coated glass-fiber material with attenuation values ranging from 5 ATN to 104 ATN units.

Turning to the drawings, FIGS. 1-2 are illustrations of one set of grayscales (print saturation density levels) representing 6 different levels of attenuation measurements. The illustrations, which also include one blank, have one font color (black only) setting and are printed as, for example, circles, although any shape applies. These figures show the ability to print on paper and PTFE-coated glass-fiber material (filter). Measured attenuation values range from 5 ATN to 104 ATN units. FIG. 1 is printed on paper and FIG. 2 is printed on PTFE-coated glass-fiber material (a filter material currently used in an Aethalometer).

Figure 3:
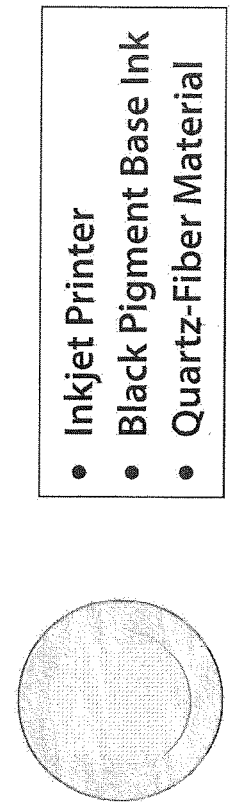
FIG. 3 is an illustration of a set of grayscale images which yield 2 different measured values of attenuation, including one blank, printed as circles in one font color setting (black) on quartz-fiber filter material. Each gray color is the result of a different print saturation density level based on the computer software employed. This figure represents printing on non-recycled paper, using an inkjet printer that employs black pigment ink a component of which is black carbon.
Figure 4:
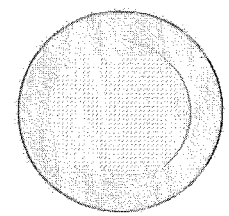
FIG. 4 is an illustration of a set of grayscale images which yield 2 different measured values of attenuation, including one blank, printed as circles in one font color setting (black) on polypropylene material. Each gray color is the result of a different print saturation density level based on the computer software employed. This figure represents printing on non-recycled paper, using an inkjet printer that employs black pigment ink a component of which is black carbon.
Figure 5:
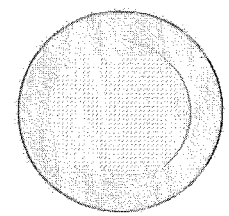
FIG. 5 is an illustration of a set of grayscale images which yield 2 different measured values of attenuation, including one blank, printed as circles in one font color setting (black) on cellulose material. Each gray color is the result of a different print saturation density level based on the computer software employed. This figure represents printing on non-recycled paper, using an inkjet printer that employs black pigment ink a component of which is black carbon.

FIGS. 3-5 are illustrations of one set of grayscales at 2 different levels of attenuation measurements or two different saturation print levels. The illustrations, which also include one blank, have one font color (black only) setting and are printed as, for example, circles, although any shape applies. These figures show the ability to print on quartz-fiber material (typical air sampling filter), polypropylene material (used as a diffuser in the 'Optical Transmissometer' instrument), and cellulose (used as a diffuser in the Transmissometer), respectively.

Circles are illustrated in FIGS. 1-5 for convenience, since they are used for measurements made with a Transmissometer or Aethalometer due to the shape of the sample chamber. Other shapes apply. Materials other than paper (i.e., materials shown in figures other than FIG. 1) were attached to paper for transport through the printer.

Figure 6:
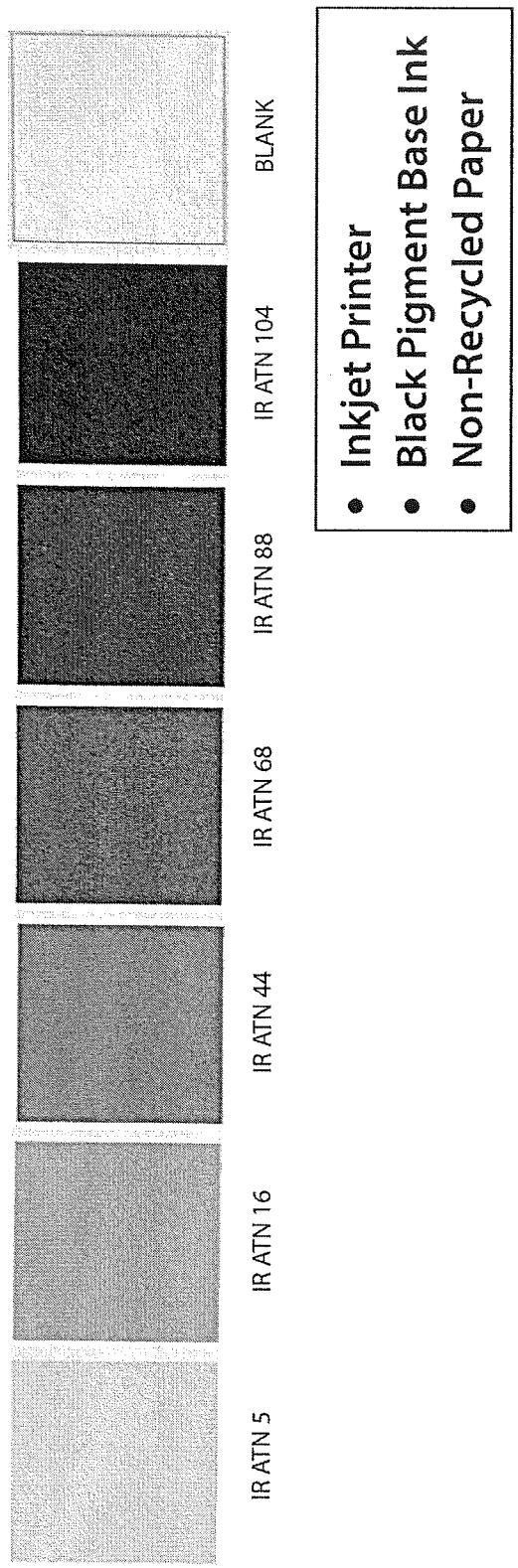
FIG. 6 is an illustration of a set of grayscale images which yield 6 different measured values of attenuation, including one blank, printed in one font color setting (black) as a strip on non-recycled paper. Each gray color is the result of a different print saturation density level based on the computer software employed. This figure represents printing on non-recycled paper, using an inkjet printer that employs black pigment ink a component of which is black carbon.

FIG. 6 illustrates one set of grayscales yielding 6 different values of attenuation measurements based on 6 different print saturation density levels. These illustrations have one font color (black only) setting and one blank as a strip printed on paper. This shows the potential use of the grayscale in, for example, developing countries where the quantitative and reproducible BC content on the filter strip has been calibrated by gravimetric or chemical analysis or by thermal-optical methods.

Figure 7A:
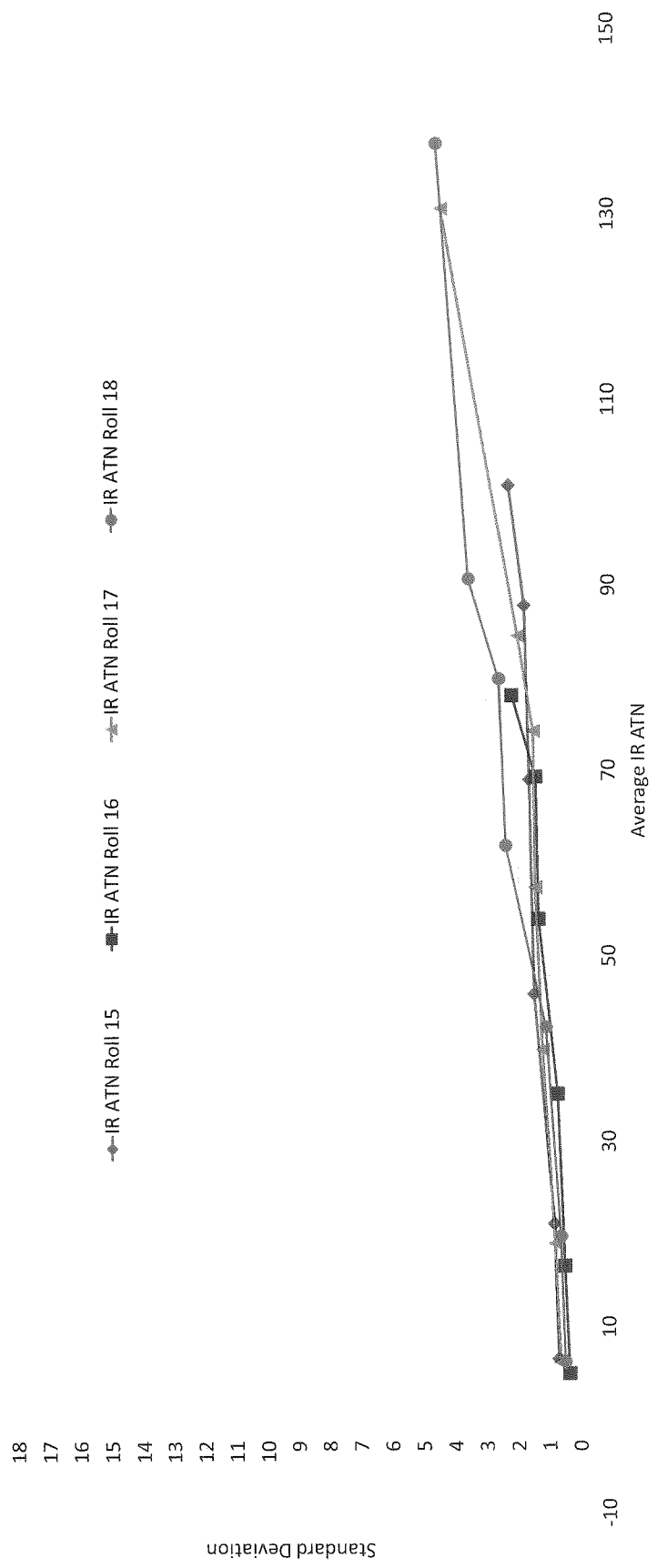
FIG. 7a is an illustration of the reproducibility as standard deviation of the average of samples measured on each roll of Aethalometer filter tape (PTFE-Coated Glass Fiber Filters) based on repeated measurements at seven print saturation density levels. Attenuation (ATN) was measured using a Model OT-21 optical Transmissometer) at 880 nm. The number of samples from each filter tape ranged from 17-23: Roll 15 (n=17); Roll 16 (n=23); Roll 17 (n=19); Roll 18 (n=19). Variation in ATN at a given print saturation density level represents variation in ATN among the different filter tape rolls, but within a filter tape roll the variation (accounting for each filter section's blank value) is low (SD<3.5).
Figure 7B:
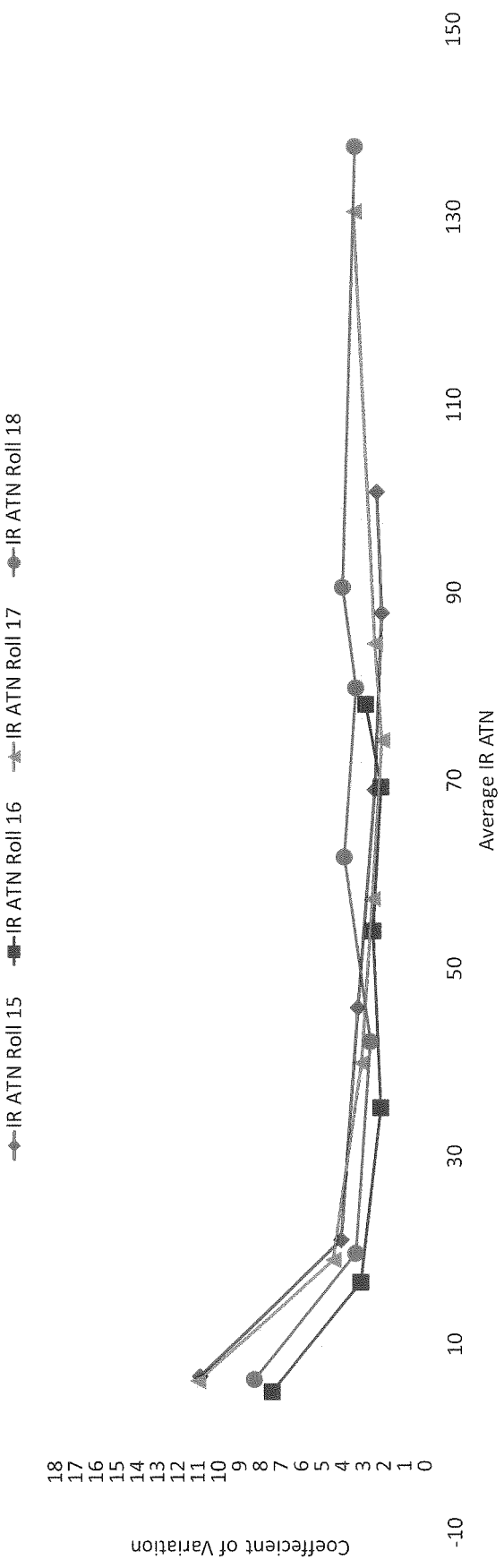
FIG. 7b. is an illustration of the reproducibility as Coefficient of Variation (SD/Average) of the average of samples measured on each roll of Aethalometer filter tape (PTFE-Coated Glass Fiber Filters) based on repeated measurements at seven print saturation density. The number of samples from each filter tape ranging from 17-23: Roll 15 (n=17); Roll 16 (n=23); Roll 17 (n=19); Roll 18 (n=19). Variation in ATN at a given print saturation density level represents variation in ATN among the different filter tape rolls, but within a filter tape roll the variation is low (accounting for each filter section's blank value) (<5% above ATN of 10; and about 10% below ATN of 10).

FIGS. 7a and 7b illustrate the reproducibility as standard deviation of the average or coefficient of variation (SD/average) of samples measured on each roll of Aethalometer filter tape (PTFE-coated glass fiber filters) based on repeated measurements at seven print saturation density levels. Optical attenuation (ATN) was measured using a transmissometer (OT-21) at 880 nm. The number of samples from each filter tape ranged from 17-23: roll 15 (n=17); roll 16 (n=23); roll 17 (n=19); roll 18 (n=19). Variation in ATN at a given print saturation density level represents variation in ATN among the different filter tape rolls, but within a filter tape roll the variation (accounting for each filter section's blank value) is low (SD<3.5; coefficient of variation <5% above ATN of 10; and about 10% below ATN of 10). This indicates to great potential of this method as a reproducible standard for measurement of ATN on filters.

Figure 8:
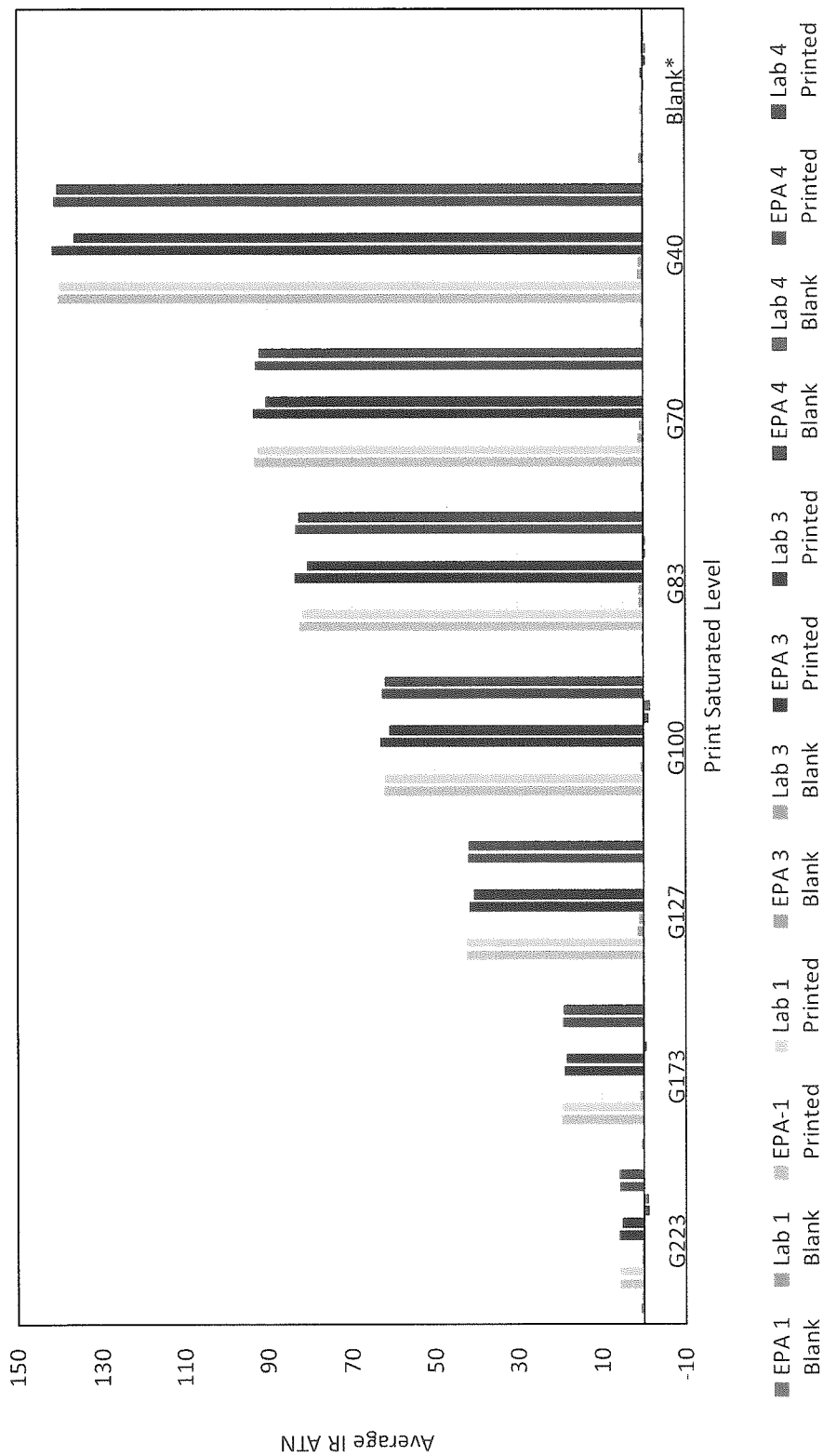
FIG. 8 is an illustration of a comparison between EPA and three independent laboratories, who are well established in obtaining optical absorption on filters. All laboratories used a transmissometer, although measurement protocols differed slightly among the laboratories. Each laboratory measured 3 sets of filters at each print saturation density level. All measurements were done in triplicate. Each set of filters contained a blank filter (Blank*) that did not pass through the printer. Blanks associated with print saturation density levels were passed through the printer but no print material was deposited.

FIG. 8 presents a comparison between EPA and three independent laboratories who are well established in obtaining optical absorption on filters. Each laboratory used a transmissometer, although measurement protocols differed slightly among the laboratories. Each laboratory measured 3 sets of filters at each print saturation density level. All measurements were done in triplicate. Each set of filters contained a laboratory blank filter that did not pass through the printer. Field blanks associated with each set of gray scale printed filters were passed through the printer but no print material was deposited on the field blank. This figure further illustrates that this method is reproducible across multiple laboratories and can help ensure measurements among laboratories are consistent, thus a validation method. The extremely high correlation coefficient ($R^2$) in FIG. 9 indicates the potential of this method to provide a quantitative relationship between light absorption and BC concentrations in mass per filter of filter material and once divided by the air sampled mass per volume in air.

Figure 9:
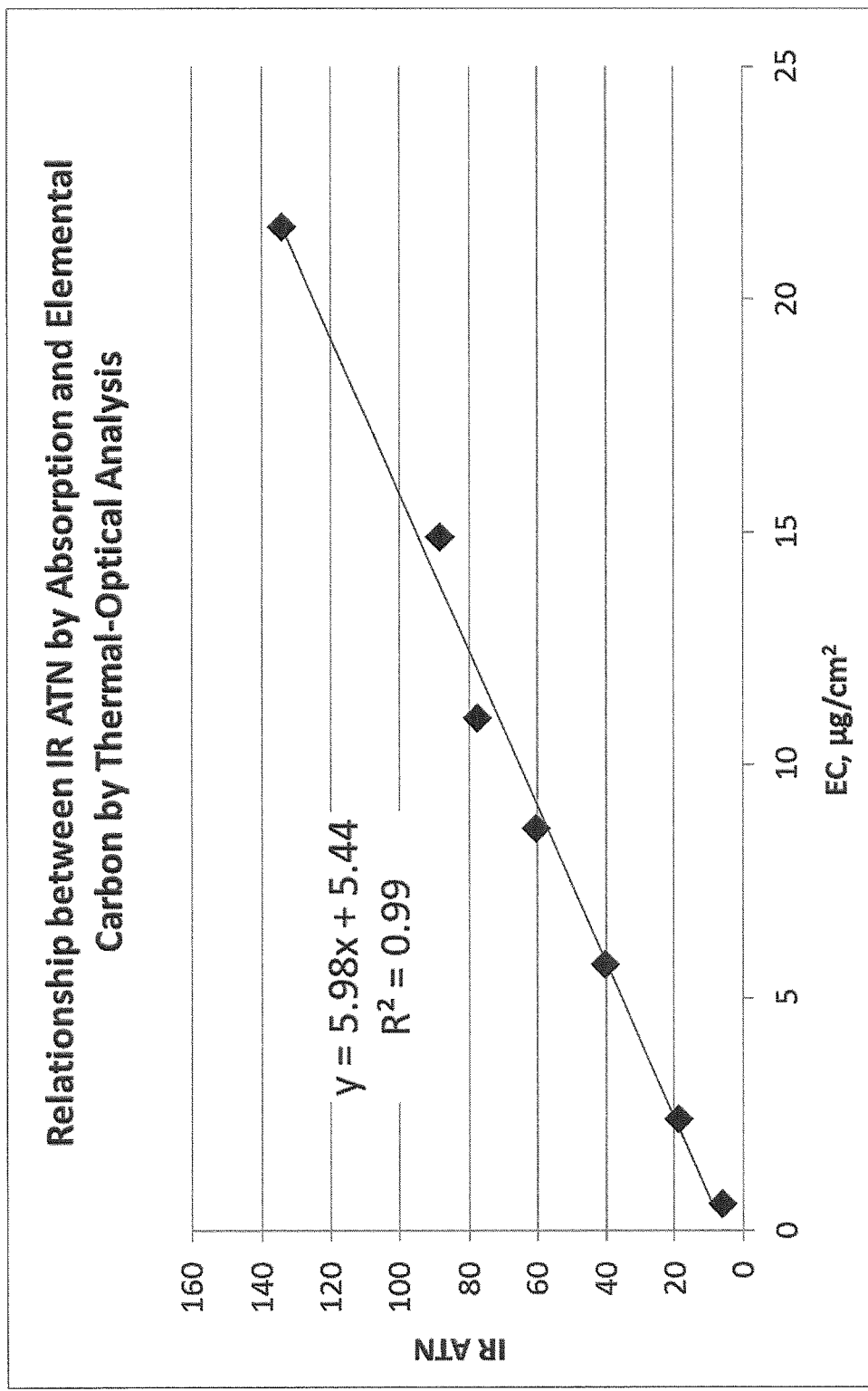
FIG. 9 is an illustration of the relationship between optical attenuation at 880 nm as measured on PTFE-coated glass fiber filters, as used in the Aethalometer, by the transmissometer (OT-21) and elemental carbon as measured on quartz-fiber filters by thermal-optical absorption.

FIG. 9 illustrates the relationship between optical attenuation at 880 nm as measured on PTFE-coated glass fiber filters, as used in the Aethalometer, by the Transmissometer (OT-21) and elemental carbon as measured on quartz-fiber filters by thermal-optical analysis. This approach is used to quantify the ATN and therefore the black carbon content collected or printed onto the filter.

Figure 10A:
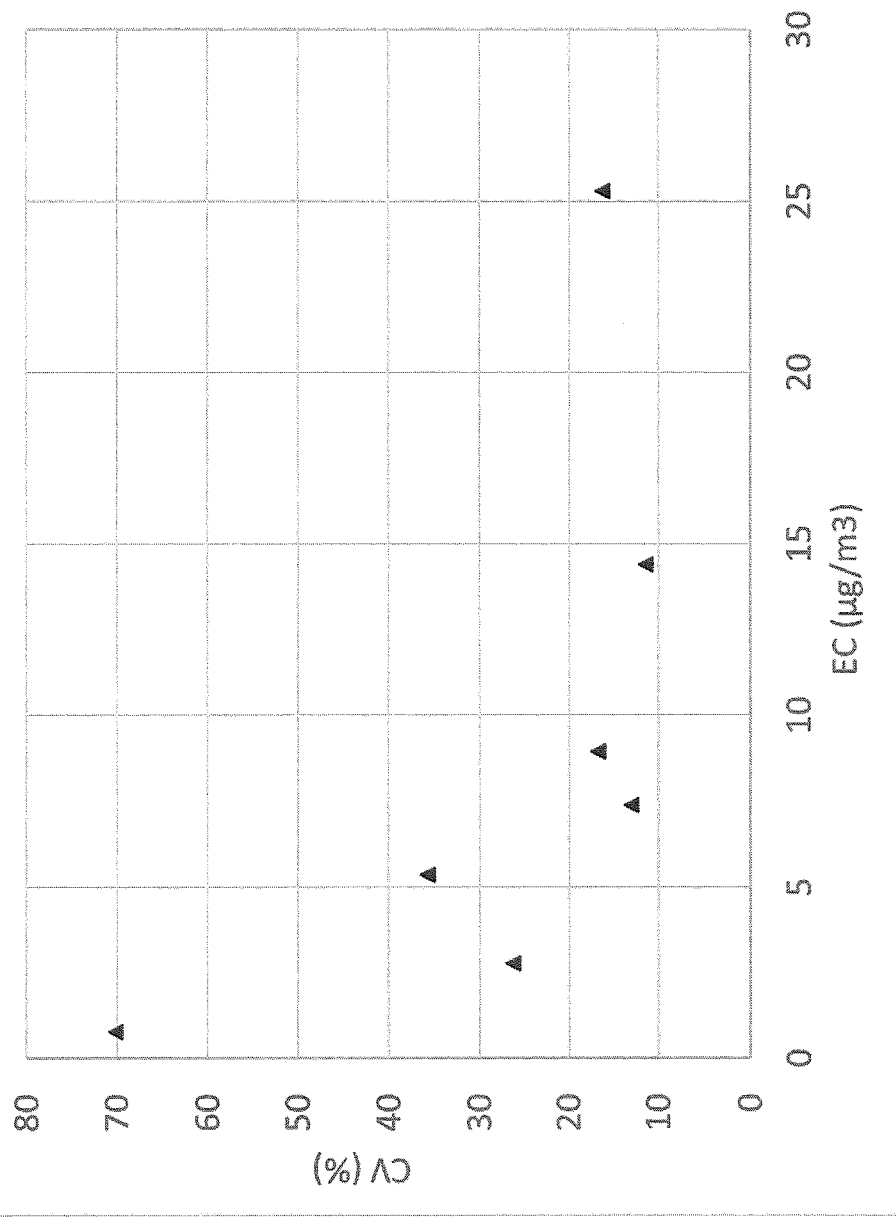
FIGS. 10a and 10b are illustrations of the reproducibility of material printed onto 5 sets of quartz-fiber filters at each print saturation density level as described in this invention and analyzed by thermal-optical analysis for organic carbon (OC) and elemental carbon (EC). EC and OC are in $\mu g/cm^2$, SD is the standard deviation of the 5 samples at that print saturation density level, and CV (%) is the coefficient of variation in percent (SD/Average times 100) of the 5 samples at that print saturation density level. CV (%) is an estimate of the reproducibility of the method, such that a value of 13% means that the 5 samples are reproducible to within 13%. Note, analysis of only 5 samples at each print saturation density level would be considered a small sample set for statistical purposes.
Figure 10B:
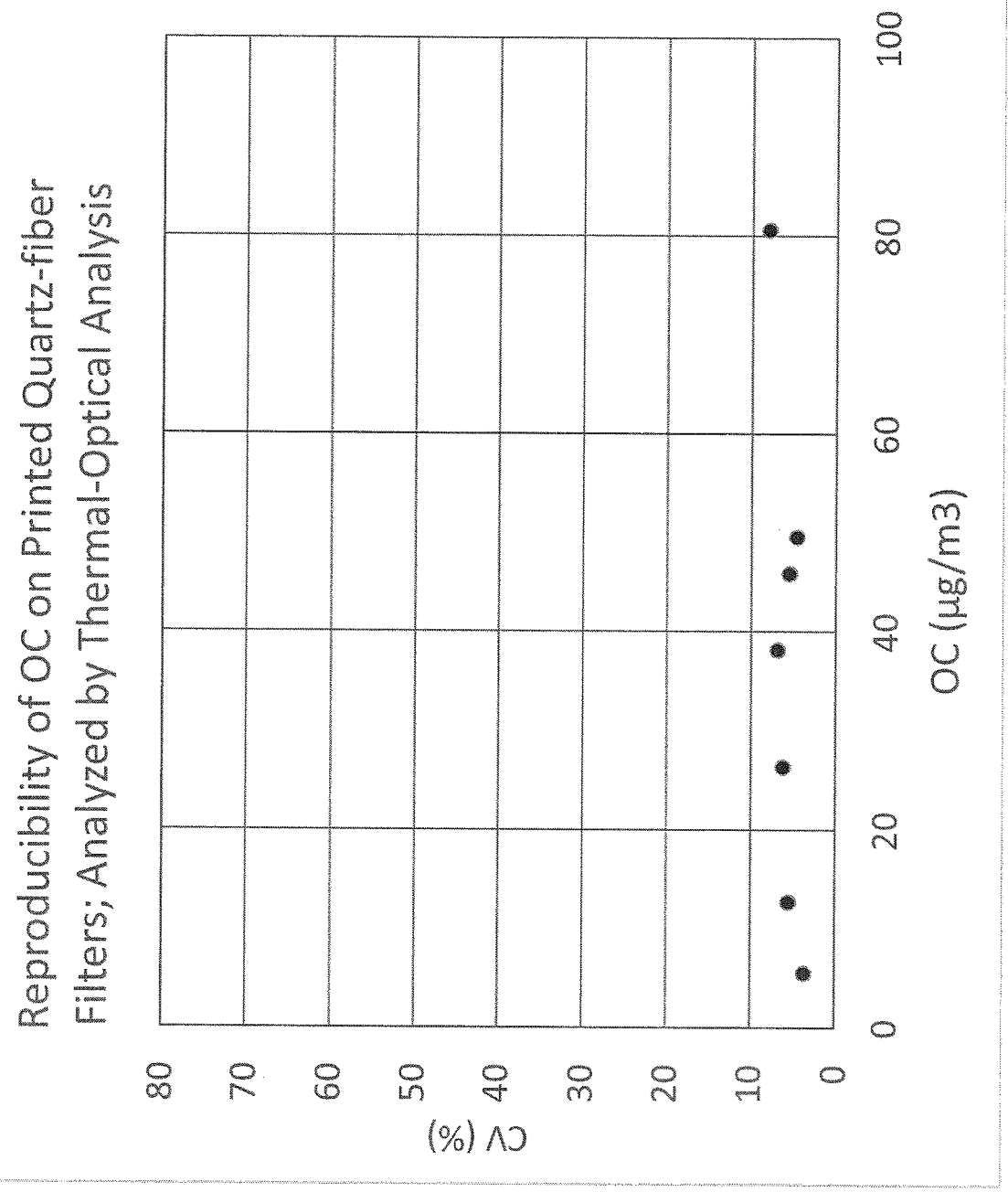

FIGS. 10a and 10b illustrate the reproducibility of material printed onto 5 sets of quartz-fiber filters at each print saturation density level as described in this invention and analyzed by thermal-optical analysis for organic carbon (OC) and elemental carbon (EC). EC and OC levels are expressed in units of $\mu g/cm^2$, SD is the standard deviation of the 5 samples at that print saturation density level, and CV (%) is the coefficient of variation in percent (SD/Average times 100) of the 5 samples at that print saturation density level. CV (%) is an estimate of the reproducibility of the method, such that a value of 13% means that the 5 samples are reproducible to within 13%. It must be noted that analysis of only 5 samples at each color level would be considered a small sample set for statistical purposes. This figure illustrates the potential of this method, providing reproducible results to calibrate thermal and thermal-optical methods for OC and EC.

In one embodiment of the invention, the substrate material may be coated with an inert substance that does not absorb light or sorb organic gases. The inert substance may be a metal, although not a metal oxide. Metals used an inert substance to coat the substrate material may include but not be limited to titanium, platinum or radium.

For use in thermal, thermal-optical, or chemical analytical methods, the ink, dye, pigment, or toner must not contain metal oxides, since these impurities have been shown to potentially impact the ability of the analysis to assign the carbon content between OC and EC fractions. The printed deposit contains both black (elemental) and organic materials; consequently, the reference or calibration standards offer reproducible known amounts of OC and BC (or EC) on a filter at a given print saturation density level. By determining the amount of BC on each filter of the same material by optical absorption and having quantified the grayscale in terms of mass in micrograms ($\mu g$) per centimeter squared ($\mu g/cm^2$), this embodiment of the invention provides a quantitative, simple, and reproducible reference for validation or calibration for BC and for thermal or thermal-optical methods for EC.

Chemical analysis may provide independent confirmation of the organic material and EC content on the filter. As noted above, BC, EC, and OC mass per unit area may also be determined gravimetrically or by knowing the mass fraction of BC (or EC) and organic material in the ink, dye, or pigment, or toner. When analyzing aerosols collected from a sampled air stream, it is necessary to multiply the mass per centimeter squared collected on the filter by the area in square centimeters of filter sampled, then divide by the volume of air sampled to estimate the air concentration of BC, EC, and OC in units of mass per volume of air sampled ($\mu g/m^3$). These units are typically of those in which concentrations of these species are reported for air quality information, although units of nanograms (ng), milligrams (mg) per volume (ng/$m^3$ or mg/$m^3$) may also be reported, as are other units.

In an embodiment of the invention, the final product comprises a series of 3 to 10 (or more) standardized gray settings (e.g., circles or other shape printed filters or paper) and 1 or 2 blanks with each set being printed on filter or paper and having the range of shades of gray (amount of black carbon and organic carbon) with optical transmission attenuation values in the range from 5 to 150 ATN units. The strip standard will also comprise 3 to 10 (or more) standard gray settings with each section of the strip having different gray settings but in a line that may be visually reviewed and compared to filters.

The approach of this invention is distinguished from past approaches which are qualitative in nature. The method used in the present invention provides for a quantified, reproducible material for comparison. In all cases the level of grayscale has been calibrated to the amount of BC (or EC) and organic material deposited on the filter. Values over 150 ATN may be included, but with a warning as to gradual loss of accuracy due to saturation. Field blanks consisting of filters, paper strips, circles or other shapes from the respective material will be included with each set of validation and calibration sets and run through the printer without print material applied to be used as a base line and subtracted from the samples in the set of gray scale samples. Laboratory blanks, not passed through the printer, are also provided to ensure no contamination from other sources. Various sizes of circular filters or other shapes of various sizes may be employed depending on the instrument to be evaluated. Sampling filter sizes typically range in diameter from 15 mm to 47 mm for circular filters, although larger or smaller sizes and different shapes may also be acceptable.

Additionally, the product may be developed as a grayscale strip including a blank, either on filter material or paper, with a range of attenuations on each strip. The reproducibly produced reference strip may be used to match grayscale by direct visual comparison to estimate the BC content in mass per unit area of a gray deposit on a collected filter. Use of filters that have a known mass of black carbon allows for quantification of the mass concentration of BC in air based on the volume of air sampled.

Estimates of the mass per unit area for BrC may also be obtained using a representative average value of the optical absorption efficiency for BrC components at different analytical wavelengths.

A similar series of quartz-fiber filters may be prepared with deposits of pigment, ink, dye, or toner (all of which must have zero metal content to avoid perturbation of the thermal analysis). These standards may then be used for validation and calibration of OC and EC in thermal, thermal-optical, and chemical analytical methods.

In one embodiment, a printer is used to apply the printed grayscale images of the invention used as reference standards.

In another embodiment of the invention, any device capable of generating a mist may be used to reproducibly generate the mist to deposit ink, pigment, or toner on paper or other materials to create the grayscale images used as reference standards. For example, an air brush may be used, although it is not designed for reproducibility of deposit. This critical feature would have to be addressed to achieve the goals of the invention. A standalone print head also may be used outside of the printer to create a reproducible deposit on paper or other materials to create the standards.

The invention provides simple, quantitative, and reproducible validation or calibration standards that currently do not exist for optical measurements of BC or BrC on filters: or for EC and OC by thermal, thermal-optical, or chemical analysis methods. While standards exist for deposits of OC on filters, they typically include only one compound at a time, such as sucrose or potassium hydrogen phthalate. The method of the present invention provides standards for EC and a range of organic components present in dye, ink, pigment, and toner. The range of organic compounds found in dye, ink, or pigment provide a more robust test of the OC analysis.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A set of reference standards for the analysis of filter samples measuring black carbon, brown carbon, organic carbon and elemental carbon, said reference standards comprising grayscale images deposited by a printer or mist at a pre-calculated density of light absorbing material on a substrate material.

2. The set of reference standards of claim 1, wherein the substrate material is at least one member of the group consisting of paper, glass-fiber, quartz-fiber, cellulose, and polypropylene.

3. The set of reference standards of claim 2, wherein the paper is non-recycled white paper.

4. The set of reference standards of claim 2, wherein the glass-fiber is PTFE-coated.

5. The set of standards of claim 2, wherein the glass-fiber, quartz-fiber, cellulose, or polypropylene are attached to paper or other reinforcing underlayment for the purpose of printing.

6. The set of reference standards of claim 1, wherein the set of reference standards has a reference range of measured attenuation values and the reference range of measured attenuation values is from 0 to 250 ATN units.

7. The set of reference standards of claim 1, wherein the samples are adapted to be analyzed using an analysis method selected from the group consisting of optical absorption, thermal analysis, thermal-optical analysis, or chemical analysis.

8. The set of reference standards of claim 1, wherein the reference standards are configured to measure black carbon (BC) at a wavelength of 880 nm and brown carbon at a wavelength of 370 nm.

9. The set of reference standards of claim 1, wherein the deposit of print or mist is made of an ink, a dye, a toner, a pigment, or mixtures of the same.

10. The set of reference standards of claim 9, wherein the ink, dye, toner, pigment, or mixtures of the same comprise carbon black.

11. The set of reference standards of claim 10, wherein the ink, dye, toner, pigment, or mixtures of the same do not comprise metal oxides.

12. The set of reference standards of claim 1 wherein the set of reference standards comprises a blank that passes through the printer and a blank that does not pass through the printer.

13. The set of reference standards of claim 1, wherein the reference standards are printed as strips on paper.

14. The set of reference standards of claim 1, wherein the substrate material is paper, and a standalone printhead creates a reproducible mist deposit to create the set of reference the standards.

15. The set of standards of claim 1, wherein the substrate material is coated with an inert substance that does not absorb light or sorb organic gases.

16. A method of making a set of reference standards for the analysis of filter samples measuring black carbon, brown carbon, organic carbon and elemental carbon, said method comprising (a) placing a substrate material in a printer and (b) depositing mist or print onto the substrate material in a pre-determined shade of gray, wherein the reference standards comprise grayscale images deposited by the printer at a pre-calculated density of light absorbing material on the substrate material.

17. The method of claim 16, wherein the substrate material is at least one member of the group consisting of paper, glass fiber, quartz fiber, cellulose, and polypropylene.

18. The method of claim 16, wherein the substrate material is paper.

19. The method of claim 16, wherein the printer is a laser printer and the print is a toner.

20. The method of claim 16, wherein the printer is an ink-jet printer and the mist is ink, dye, pigment, or mixtures of the same.

* * * * *